US012804036B2

(12) United States Patent
Baek et al.

(10) Patent No.: US 12,804,036 B2
(45) Date of Patent: Nov. 17, 2026

(54) BLOCKCHAIN NETWORK SYSTEM BASED ON RANDOM CONTENTION-FREE CONSENSUS AND OPERATION METHOD

(71) Applicant: LEADPOINT SYSTEM INC., Jeonju-si (KR)

(72) Inventors: Eun Ju Baek, Namyangju-si (KR); Do Hyoung Kim, Namyangju-si (KR)

(73) Assignee: LEADPOINT SYSTEM INC., Jeonju-si (KR)

( * ) Notice: Subject to any disclaimer, the term of this patent is extended or adjusted under 35 U.S.C. 154(b) by 0 days.

(21) Appl. No.: 19/137,043

(22) PCT Filed: Dec. 9, 2022

(86) PCT No.: PCT/KR2022/020064
§ 371 (c)(1),
(2) Date: Jun. 9, 2025

(87) PCT Pub. No.: WO2024/122697
PCT Pub. Date: Jun. 13, 2024

(65) Prior Publication Data

US 2026/0205514 A1 Jul. 16, 2026

(51) Int. Cl.

| | |
|---|---|
| ***H04L 67/1074*** | (2022.01) |
| ***H04L 9/00*** | (2022.01) |
| ***H04L 9/32*** | (2006.01) |

(52) U.S. Cl.
CPC ........ *H04L 67/1074* (2013.01); *H04L 9/3236* (2013.01); *H04L 9/50* (2022.05)

(58) Field of Classification Search
None
See application file for complete search history.

(56) References Cited

U.S. PATENT DOCUMENTS

2019/0012595 A1* 1/2019 Beser .................... G06N 3/045
2020/0026699 A1 1/2020 Zhang et al.

FOREIGN PATENT DOCUMENTS

| | | | | |
|---|---|---|---|---|
| KR | 10-2020-0083145 A | 7/2020 | | |
| KR | 10-2020-0144466 A | 12/2020 | | |
| KR | 10-2022-0013846 A | 2/2022 | | |
| KR | 10-2022-0148397 A | 11/2022 | | |
| WO | WO-2020055413 A1 * | 3/2020 | .......... | H04L 9/3239 |

OTHER PUBLICATIONS

International Search Report issued in PCT/KR2022/020064; mailed Aug. 22, 2023.

* cited by examiner

*Primary Examiner* — Brandon Hoffman
(74) *Attorney, Agent, or Firm* — Harvest IP Law, LLP

(57) ABSTRACT

The present specification relates to a blockchain network system, and an operation method of a node accessing a blockchain network comprises: selecting a participant node, a congress node, a committee node, and a chair node on the basis of a random contention-free consensus to configure the role of each node; receiving, by the chair node, a delegation request from the congress node and using a transaction satisfying a consensus condition to instruct the committee node to perform block generation; approving, by the committee node, the block generation by communicating with the chair node; and disseminating, to the blockchain network, a new block generated as a result of the approval.

9 Claims, 7 Drawing Sheets

BLOCKCHAIN NETWORK SYSTEM BASED ON RANDOM CONTENTION-FREE CONSENSUS AND OPERATION METHOD

CROSS-REFERENCE TO RELATED APPLICATIONS

This application is the National Stage filing under 35 U.S.C. 371 of International Application No. PCT/KR2022/020064, filed on Dec. 9, 2022, the contents of which are incorporated herein in their entirety.

TECHNICAL FIELD

The present specification relates to a blockchain network system, and more particularly, to defining roles of nodes accessing a blockchain network based on random non-competitive consensus, operation methods performed by each node, and a blockchain network system using the same.

BACKGROUND ART

Blockchain refers to a distributed data storage technology that stores data in blocks, connects them in a chain form, and simultaneously replicates and stores them on numerous computers, utilizing P2P (Peer to Peer) networks. The distributed database utilized by blockchain is a technology that physically distributes data to allow multiple users to share large-scale databases. Blockchain is a list of data storage structures where network participant node terminals can store data and jointly record and manage ledger data recording transaction information through verification.

As an example of blockchain utilization, blockchain can be implemented by node terminals of cryptocurrency users connected via the internet forming a P2P network. Through this, blocks containing cryptocurrency transaction details can be managed at user node terminals and connected and propagated with new blocks. When a new block is generated, verified blocks can be connected with existing blocks through consensus algorithms of multiple participants (node terminals) and can be confirmed as final ledgers containing transaction details for distributed storage. Also, when transactions occur at participant node terminals, verified transaction information is propagated to each node terminal through validity verification of the transactions. Through this, transaction details, i.e., verified transactions, are propagated and distributed stored, and when data at some nodes is falsified, authenticity can be identified based on distributed stored transactions. The security stability of blockchain increases as more users who share data. Blockchain is being utilized in various online services such as cloud computing services in addition to Bitcoin.

Blockchain technology can enable reduced transaction costs and prevention of data falsification by changing the existing centralized data management structure to decentralized or distributed. Such blockchain technology can create economic value by combining with industries such as finance, healthcare, content, public services, logistics, distribution, and energy sectors.

In blockchain, nodes participating in the network can generate blocks and propagate generated block information to other nodes. Also, nodes that receive new block information can determine and verify the consistency of new block information. At this time, validity verification of transaction details that may be included in newly generated blocks, i.e., transactions, can also be performed at nodes participating in the blockchain network.

Additionally, consensus algorithms can be applied to blockchain networks to ensure the integrity of block information constituting ledgers managed by participating nodes and to review legitimacy. Common consensus algorithms include Proof of Work (PoW), Proof of Stake (POS), Delegated Proof of Stake (DPOS), PBFT (Practical Byzantine Fault Tolerance), etc.

Proof of Work (PoW) is a method of suppressing fraud by proving that resources (e.g., computing power) have been invested for work, and participating nodes must invest resources to participate in proof of work. Spam or DoS attacks also require investing more than 51% of resources to succeed.

Proof of work requires a unique hash value to generate blocks, and since this unique hash value must be found by randomly substituting nonce values, excessive resources such as computing power must be invested to find such unique hash values, causing cost and environmental problems due to power consumption, specialized chips with concentrated functions emerge, and this can cause centralization problems due to consolidation of computing power.

To solve this, Proof of Stake (POS) was proposed, which adopts a method where proof is possible in proportion to the node's holdings. Proof of stake makes the probability of generating blocks proportional to the token stake held by each node. If proof of stake views token stakes as invested resources, it can be seen as a specific type of proof of work. The proof of stake algorithm formula can be expressed as 'proof of work using digest'. Compared to proof of work, proof of stake has almost no energy consumption and makes resource concentration difficult.

However, since proof of stake becomes more advantageous with more stakes, block generation centralization problems can occur due to stakes, and nodes may tend to only collect tokens without using them. Furthermore, since the stake reaches 100% at the genesis block point corresponding to the first block of the blockchain, the person who initiated the system can recreate all blocks multiple times. Since nodes can restart from that point if they only have stakes, falsification cannot be prevented with proof of stake alone.

To solve these problems, Korean Patent Publication No. 2019-0122149 presented below proposed a consensus node selection method using nonce. Since this method uses a fair random consensus body, it doesn't require excessive resource use like proof of work, and to improve the disadvantage of nodes with many resources monopolizing update rights like proof of stake, only some selected as consensus bodies according to hash chains among all nodes participate in block generation to minimize resource consumption, and make it unpredictable in advance which node will acquire block generation rights through a random non-competitive process while ensuring that a certain number or more of consensus nodes are selected.

Nevertheless, blockchain networks already established worldwide like Bitcoin or Ethereum still use proof of work and proof of stake methods, and private blockchain networks operate networks where only small-scale nodes can participate like PBFT to preserve communication efficiency. Even if new consensus techniques are proposed to build new networks, it is very difficult to quickly overcome the waste of resources and social costs caused by already vastly established existing blockchain networks.

DISCLOSURE

Technical Problem

The technical problem that embodiments of the present specification aim to solve is to resolve the weaknesses of consensus time delay, consensus performance degradation, or centralization appearing due to adopting consensus algorithms according to proof of work or proof of stake methods in conventional blockchain network systems, solve the problem of inefficiency where existing blockchain networks cannot be utilized when trying to introduce new consensus algorithms, and overcome the limitation that substantial means for linking or combining with existing blockchain networks do not exist.

The technical problems to be achieved in the present specification are not limited to the technical problems mentioned above, and other technical problems not mentioned will be clearly understood by those skilled in the art to which the present specification belongs from the following description.

Technical Solution

To solve the above technical problem, a method of operating a node accessing a blockchain network according to an embodiment of the present specification comprises: configuring roles of nodes by selecting each of a participant node, a congress node, a committee node, and a chair node based on random non-competitive consensus; the chair node receiving a delegation request from the congress node and instructing the committee node to generate a block using transactions that meet consensus conditions; the committee node communicating with the chair node to approve block generation; and propagating a new block generated according to the approval result to the blockchain network.

In the method of operating a node accessing a blockchain network according to an embodiment, wherein the configuring roles of nodes comprises: selecting a congress node, which is a node that has passed qualification verification for participating in consensus of the next block, from participant nodes participating in random non-competitive consensus; selecting committee nodes according to a consensus quorum from the congress nodes; and designating the chair node corresponding to the congress nodes or committee nodes.

In the method of operating a node accessing a blockchain network according to an embodiment, further comprises: The method of claim 1, wherein the instructing block generation comprises: selecting transactions necessary for a delegation request from a transaction pool of the blockchain network; the congress node generating a delegate request MSG including the selected transactions and transmitting to the chair node; and the chair node generating a prepare MSG including only transactions that meet consensus conditions among the delegate request messages and transmitting it to all committee nodes. Additionally, wherein the instructing block generation further comprises: the chair node receiving and parsing the delegate request message to generate a prepare message, and adding transactions that do not meet the consensus conditions to the transaction pool.

In the method of operating a node accessing a blockchain network according to an embodiment, wherein the approving block generation comprises: the committee node parsing the prepare message and checking whether transactions included in the prepare message exist in its own transaction pool, then generating a commit MSG through filtering and transmitting it to the chair node; and the chair node parsing the commit message to generate a committed MSG containing random non-competitive data and transmitting it through an indirect method via block propagation.

The method of operating a node accessing a blockchain network according to an embodiment further comprises: when the committed message is generated, providing verification data to verify that the block of the blockchain network was generated by random non-competitive consensus by including it in the new block; and a general node verifying the new block received through the blockchain network using the verification data.

In the method of operating a node accessing a blockchain network according to an embodiment, wherein the propagating the new block to the blockchain network comprises: delivering an approval result to the participant node when a new random non-competitive block is added to the blockchain network; and the participant node parsing the committed message included in the new random non-competitive block to verify whether it is a Genesis Committed MSG.

In the method of operating a node accessing a blockchain network according to an embodiment, wherein the propagating the new block to the blockchain network further comprises: selecting transactions to include in the message when the verification result is a Genesis Committed Message and the participant node is a congress node; or waiting for a newly generated block when the verification result is a Genesis Committed Message and the participant node is not a congress node.

The method of operating a node accessing a blockchain network according to an embodiment further comprises: obtaining a current block height from the blockchain network; the chair node generating a Genesis Committed Message for starting consensus using the current block height; and the chair node transmitting the generated Genesis Committed Message to all participant nodes through the network.

In the method of operating a node accessing a blockchain network according to an embodiment, wherein the random non-competitive consensus: derives non-competitive consensus between nodes, wherein only some nodes among nodes accessing the blockchain network participate in consensus by acquiring participation qualifications using a nonce value for each block, and maintains a Byzantine node ratio among all nodes below a predetermined ratio.

Advantageous Effects

The embodiments of the present specification can utilize conventional blockchain networks that do not adopt random non-competition as blockchain networks based on random non-competitive consensus by defining the roles of nodes and their respective operations, thereby controlling existing proof of work or proof of stake blockchain networks to no longer operate in proof of work or proof of stake methods, or controlling them to operate limitedly according to the minimum number of nodes in Byzantine fault-tolerant consensus bodies, while enabling the operation of random consensus body proof-based blockchain networks based on established blockchain networks.

Accordingly, it is possible to convert to utilize as a random consensus body proof-based blockchain network while maximally maintaining the infrastructure and utility of established blockchain networks that do not adopt random non-competition, thereby preventing waste of resources and social costs while providing an efficient and fair blockchain network platform system.

The effects obtainable from the present specification are not limited to the effects mentioned above, and other effects not mentioned will be clearly understood by those skilled in the art to which the present specification belongs from the following description.

DESCRIPTION OF DRAWINGS

The accompanying drawings, which are included as part of the detailed description to help understand the present specification, provide embodiments of the present specification and explain the technical features of the present specification together with the detailed description.

DESCRIPTION OF REFERENCE NUMERALS

10: Node based on random non-competitive consensus
20: Blockchain network
30: Consensus body blockchain system
10A, 10B, 10C: Nodes based on random non-competitive consensus
11: Communication unit
13: Processor
15: Memory

BEST MODE FOR CARRYING OUT THE MODE FOR DISCLOSURE

A method of operating a node accessing a blockchain network according to an embodiment of the present specification comprises: configuring roles of nodes by selecting each of a participant node, a congress node, a committee node, and a chair node based on random non-competitive consensus; the chair node receiving a delegation request from the congress node and instructing the committee node to generate a block using transactions that meet consensus conditions; the committee node communicating with the chair node to approve block generation; and propagating a new block generated according to the approval result to the blockchain network.

[Mode for Disclosure]

Hereinafter, embodiments of the present specification will be described in detail with reference to the drawings. However, detailed descriptions of well-known functions or configurations that may obscure the gist of the embodiments will be omitted in the following description and accompanying drawings. In addition, throughout the specification, 'including' a certain component means that other components may be further included, not excluding other components, unless specifically stated otherwise.

Terms used in the present specification are used only to describe specific embodiments and are not intended to limit the present specification. Singular expressions include plural expressions unless the context clearly indicates otherwise. In this application, terms such as "include" or "comprise" are intended to specify the presence of stated features, numbers, steps, operations, components, parts, or combinations thereof, but should be understood not to preclude the presence or addition of one or more other features, numbers, steps, operations, components, parts, or combinations thereof.

Unless specifically defined otherwise, all terms used herein, including technical or scientific terms, have the same meaning as commonly understood by one of ordinary skill in the art to which the present specification belongs. Terms such as those defined in commonly used dictionaries should be interpreted as having meanings consistent with their meanings in the context of the relevant art and should not be interpreted in an idealized or overly formal sense unless explicitly defined in the present specification.

Figure 1:
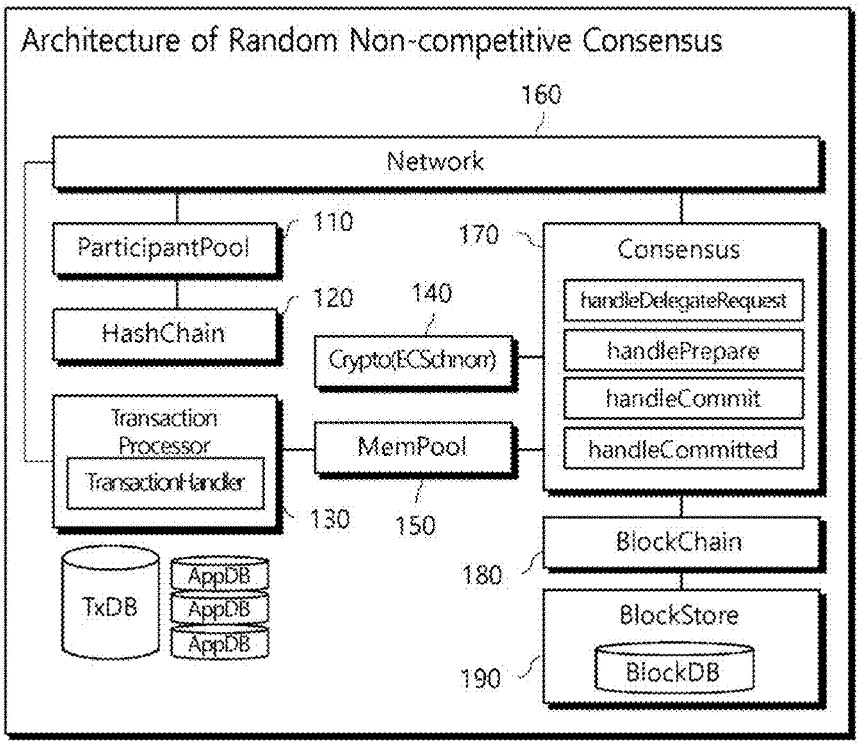
FIG. 1 is a block diagram showing a random non-competitive architecture.

FIG. 1 is a block diagram showing a random non-competitive architecture, proposing components corresponding to individual functions required to implement the random non-competitive consensus algorithm.

The Participant Pool (110) is a component that manages registration, deletion, or update of participant nodes that have registered hash chains. The Hash Chain (120) is a component that manages nonces for acquiring and verifying consensus participation qualifications. The Transaction Processor (130) is a component that manages verification and execution of transactions by transaction type. Crypto (ECSchnorr) (140) is a component that performs signature, verification, and multi-signature management of consensus messages. MemPool (150) is a component that manages transactions subject to consensus. Network (160) is a component that handles connection management between nodes, message transmission/reception, and message serialization/deserialization. Random non-competitive Consensus (170) is a component that manages block consensus. Blockchain (180) is a component that manages the consensus state of each block and related data structures. Block Store (180) is a component that manages storage of agreed blocks.

Figure 2:
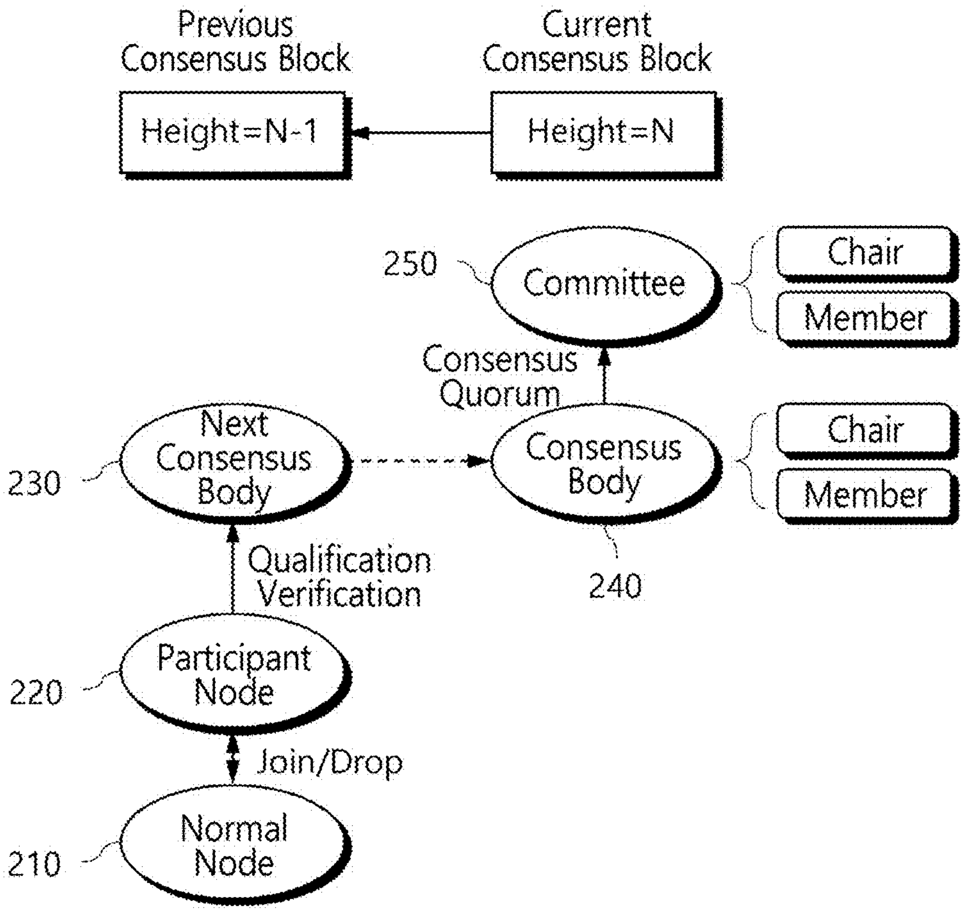
FIG. 2 is a diagram for explaining the principle of the random non-competitive consensus algorithm.

FIG. 2 is a diagram for explaining the principle of the random-based non-competitive consensus algorithm, where node types are classified into normal node, participant node, congress node, committee node, and chair node, and the role of each node is defined.

The random non-competitive consensus algorithm is a decentralized non-competitive consensus algorithm that guarantees equal participation opportunities for all nodes. Not all nodes connected to the blockchain network participate in consensus, but only some of them are utilized to achieve efficient consensus while proposing technical means to solve the problems of consensus time delay, consensus performance degradation, or centralization pointed out in conventional consensus methods.

A normal node (210) is a node connected to the blockchain network, and nodes participating in random non-competitive consensus are named participant nodes (220). Among participant nodes (220), nodes that pass qualification verification according to random-based non-competitive consensus are selected as congress nodes to form the next consensus body (230). That is, the next consensus body (230) refers to participant nodes that have acquired the qualification to participate in consensus in the next block and are named congress nodes.

When proceeding from the previous consensus block to the current consensus block, the previously selected consensus body (240) (composed of congress nodes) is determined as at least one of a chair that mediates consensus and members that propose candidate blocks. Now, when the consensus body (240) meets the consensus quorum, it forms a committee (250). The committee node (250) is determined as at least one of a chair that generates blocks and members that process block verification and signatures.

As described above, by assigning at least one of the above-mentioned roles to nodes connected to the blockchain network, consensus can be performed using only some of all nodes, and consensus can be derived in a decentralized non-competitive manner without consensus time delay or consensus performance degradation.

Figure 3:
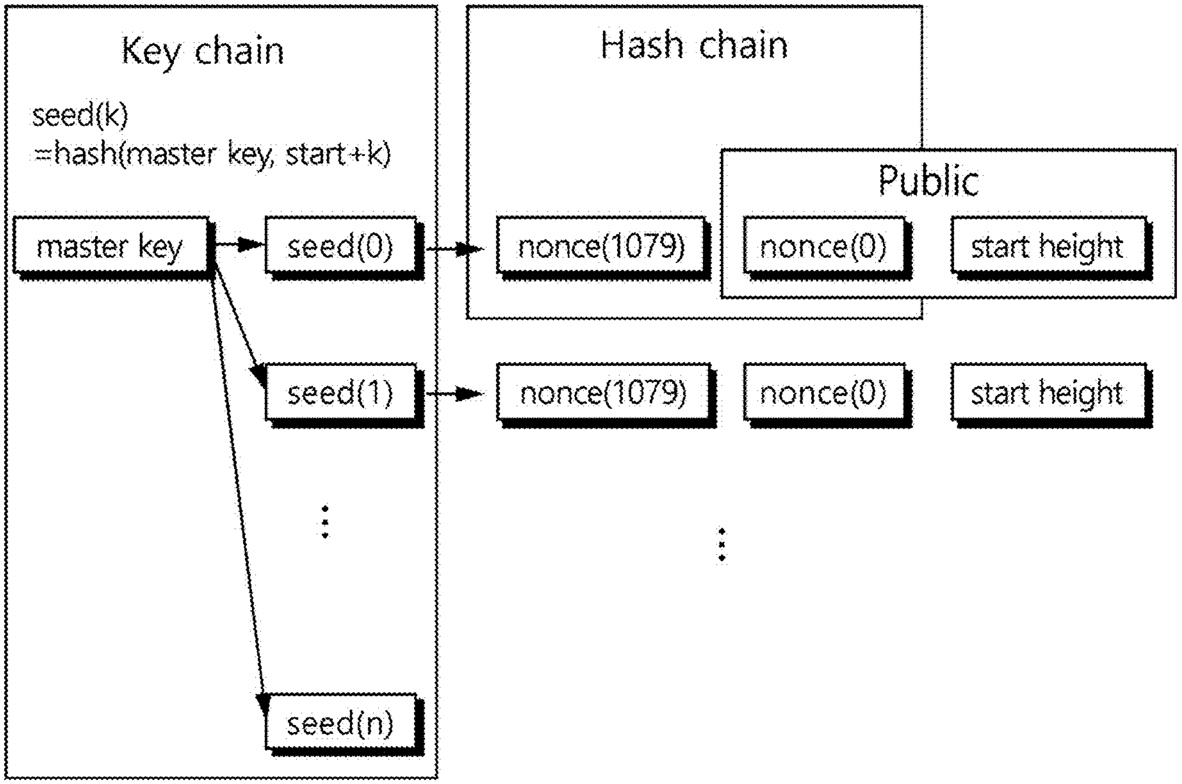
FIG. 3 is a diagram for explaining the random non-competitive consensus body propagation process.

FIG. 3 is a diagram for explaining the random non-competitive consensus body propagation process. Random non-competition is achieved through a random node selection and verification process using hash chains. At this time, all nodes can verify qualifications only once per height, require the hash of the previous block for qualification verification, cannot predict participation qualifications in advance, and can verify whether the participation qualifications of consensus participating nodes are legitimate during node verification.

Hash chains are hash chains for selecting and verifying consensus subject nodes, where only the start_height and nonce(0) of the hash chain are public. Here, the following mathematical formula can be utilized to verify consensus subject qualifications.

$$\text{Rule(height)} = \text{hash(hash(Block\_Hd(height} - 1)) + \text{nonce(height} - \text{start\_height))} \quad \text{[formula 1]}$$

Here, Formula 1 means the sum of the hash value of the previous block and the current height nonce value. Now, qualifications can be verified by comparing the value according to Formula 1 with a threshold (minimum node guarantee difficulty for consensus).

As described above, the random non-competitive consensus algorithm proposed minimum consensus nodes through consensus quorum control, minimizes consensus stages, and enables consensus of large-scale nodes by lowering message complexity for consensus.

Figure 4:
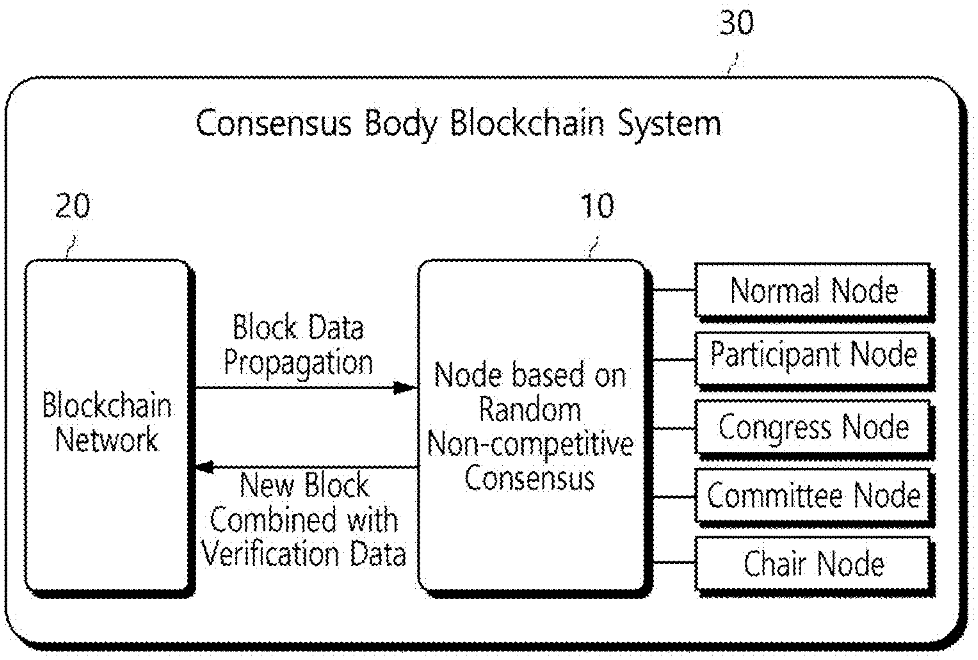
FIG. 4 is a block diagram showing the consensus body blockchain system adopted by the embodiments of the present specification.

FIG. 4 is a block diagram showing the consensus body blockchain system (30) adopted by the embodiments of the present specification, which largely includes a blockchain network (10) and nodes based on random non-competitive consensus (10). At this time, as node (10) types, at least one of normal node, participant node, congress node, committee node, and chair node can be determined as previously described.

The consensus blockchain network system (30) adopted by the embodiments of the present specification can configure a mesh network topology blockchain network by one or more node (10) terminals connected through wired or wireless networks. Node (10) terminals are connected to the blockchain network through input/output devices and can exchange data. The blockchain network system (30) can include various electronic systems as node terminals, such as mobile devices like mobile phones, smartphones, PDAs, tablet computers, laptop computers, computing devices like personal computers, tablet computers, netbooks, or electronic products like televisions, smart televisions, security devices for gate control.

Each node (10) terminal may have a communication module for accessing the blockchain network. The blockchain network can be implemented as wired networks such as Local Area Network (LAN), Wide Area Network (WAN), or Value Added Network (VAN). Also, the blockchain network can be implemented as all types of wireless networks such as mobile radio communication network, satellite communication network, Bluetooth, Wibro (Wireless Broadband Internet), HSDPA (High Speed Downlink Packet Access), Wi-Fi, LTE (Long Term Evolution). If necessary, the blockchain network can be a mixed wired and wireless network.

Each node (10) terminal can register its account information according to its node connection in transaction ledger data shared in a cloud manner through the network. And when transactions of encryption information for generating blockchains are needed, each trader terminal can propagate transaction information to be recorded in the transaction ledger data to each trader terminal. And according to corresponding mutual verification processing, transaction ledger data is updated and that information is shared, allowing transactions of encryption information for generating blockchains to be processed. Here, the transaction ledger data can be linked with blockchain data having a structure where multiple blocks are sequentially connected in generation order by having blocks corresponding to certain time or units include hash values for previously generated blocks. Accordingly, verification of whether transaction ledger data has been falsified can be easily processed according to hash value verification of the blockchain.

The security stability of such blockchains can be formed by the participation of sharers who share data in the system. Therefore, transaction information blocks including details of sharing between each sharer terminal connected to the blockchain network and details of issuance/transaction of encryption information for generating blockchains can be stored sequentially, and transaction verification processing for sequentially block-chaining hash values to prevent falsification can be performed distributed at each trader terminal.

In such transaction verification processing, as shown in FIG. 4, the existing blockchain network (20) can be conventional various proof-based blockchain networks. Representatively, it can be a blockchain network (20) according to Proof of Work (PoW), Proof of Stake (POS), etc., for example, blockchain networks such as Bitcoin, Ethereum.

In response to this, the node (10) proposed by the embodiments of the present specification can configure new blocks that combine consensus body validity verification data based on random non-competitive consensus, and can process the configured new blocks to be propagated through blockchain networks (20) according to consensus algorithms that are not random non-competitive.

Accordingly, in blockchain networks (20) that are not random non-competitive, the propagated block data is shared within the network again, and the next block can be processed to be generated again by nodes (10) based on random non-competitive consensus. Since no additional proof of work or proof of stake is required in this process, the motivation for devising the present specification that can implement decentralization in a non-competitive manner can be achieved.

That is, according to the embodiments of the present specification, by building existing blockchain networks (20) that do not adopt random non-competition with nodes (10) based on random non-competitive consensus that enable utilization as blockchain network systems (30) based on random non-competitive consensus, it is possible to control existing proof of work or proof of stake blockchain networks to no longer operate in proof of work or proof of stake methods, or control them to operate limitedly according to the minimum number of nodes in Byzantine fault-tolerant consensus bodies, while providing nodes (10) that form networks enabling the operation of random consensus body proof-based blockchain networks based on established blockchain networks.

Accordingly, it is possible to convert to utilize as a random consensus body proof-based blockchain network while maximally maintaining the infrastructure and utility of conventionally established consensus algorithm-based blockchain networks, thereby providing an efficient and fair random non-competitive consensus-based process while preventing waste of resources and social costs. Here, participation qualification verification of random consensus bodies can use one-time nonce-based hash chains and hash verification processes, but this is only an example, and designation of random consensus bodies or participation qualification verification can be possible in various other ways.

Figure 5:
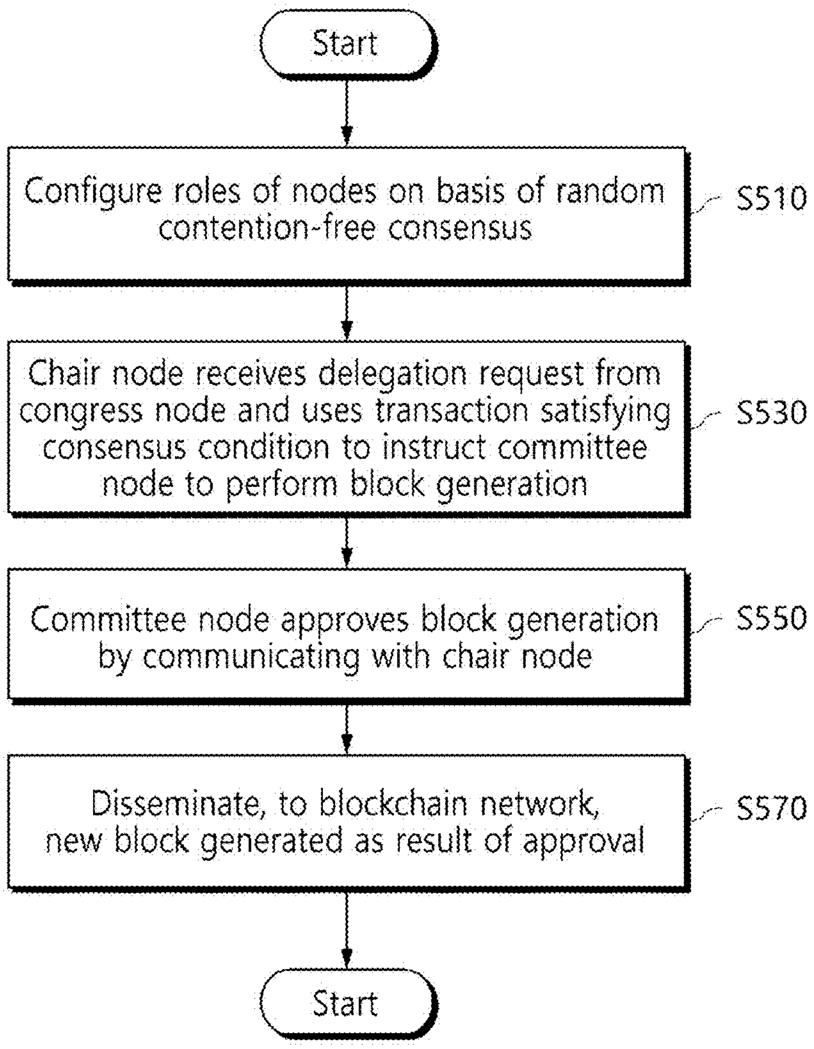
FIG. 5 is a flowchart showing an operation method of a node accessing a blockchain network based on random non-competitive consensus according to an embodiment of the present specification.

FIG. 5 is a flowchart showing an operation method of a node accessing a blockchain network based on random non-competitive consensus according to an embodiment of the present specification, defining each step to achieve decentralized non-competitive consensus while being easily combined with conventional blockchain networks, focusing on the roles and functions of nodes.

In step S510, the blockchain system configures the roles of nodes by selecting each of a participant node, congress node, committee node, and chair node based on random non-competitive consensus. In this step, a congress node, which is a node that has passed qualification verification for participating in consensus of the next block from participant nodes participating in random non-competitive consensus, is selected, a committee node is selected according to the consensus quorum from congress nodes, and the chair node is designated corresponding to the congress node or committee node. Designating each role from nodes in a decentralized, non-competitive manner is as previously described through FIG. 2.

Here, random non-competitive consensus derives non-competitive consensus between nodes, where only some nodes among nodes accessing the blockchain network participate in consensus by obtaining participation qualifications using nonce values for each block, and it is preferable to maintain the Byzantine node ratio among all nodes below 33%.

In step S530, the chair node receives a delegation request from the congress node and instructs the committee node to generate a block using transactions that meet consensus conditions. In this process, first, transactions necessary for the delegation request are selected from the transaction pool of the blockchain network, and the congress node generates a delegate request MSG including the selected transactions and transmits it to the chair node.

Then, the chair node can generate a prepare MSG including only transactions that meet consensus conditions among the delegate request messages and transmit it to all committee nodes. At this time, the chair node can generate a prepare message by receiving and parsing the delegate request message, and add transactions that do not meet the consensus conditions to the transaction pool.

In step S550, the committee node communicates with the chair node to approve block generation. In this process, the committee node parses the prepare message and checks whether transactions included in the prepare message exist in its own transaction pool, then generates a commit MSG through filtering and transmits it to the chair node. Then, the chair node can parse the commit message to generate a committed MSG containing random non-competitive data and transmit it through an indirect method via block propagation.

Meanwhile, when the committed message is generated, verification data can be provided by including it in the new block to verify that the block of the blockchain network was generated by random non-competitive consensus. Accordingly, a general node can verify the new block received through the blockchain network using the verification data.

In step S570, the new block generated according to the approval result is propagated to the blockchain network. In this process, when a new random non-competitive block is added to the blockchain network, the approval result is delivered to the participant node. Then, the participant node can parse the committed message included in the new random non-competitive block to verify whether it is a Genesis Committed MSG.

At this time, if the verification result is a Genesis Committed Message and the participant node is a congress node, it can select transactions to include in the message. On the other hand, if the verification result is a Genesis Committed Message and the participant node is not a congress node, it can wait for a newly generated block.

Furthermore, when obtaining the current block height from the blockchain network, the chair node can generate a Genesis Committed Message for starting consensus using the current block height. Then, the chair node can transmit the generated Genesis Committed Message to all participant nodes through the network.

Figure 6:
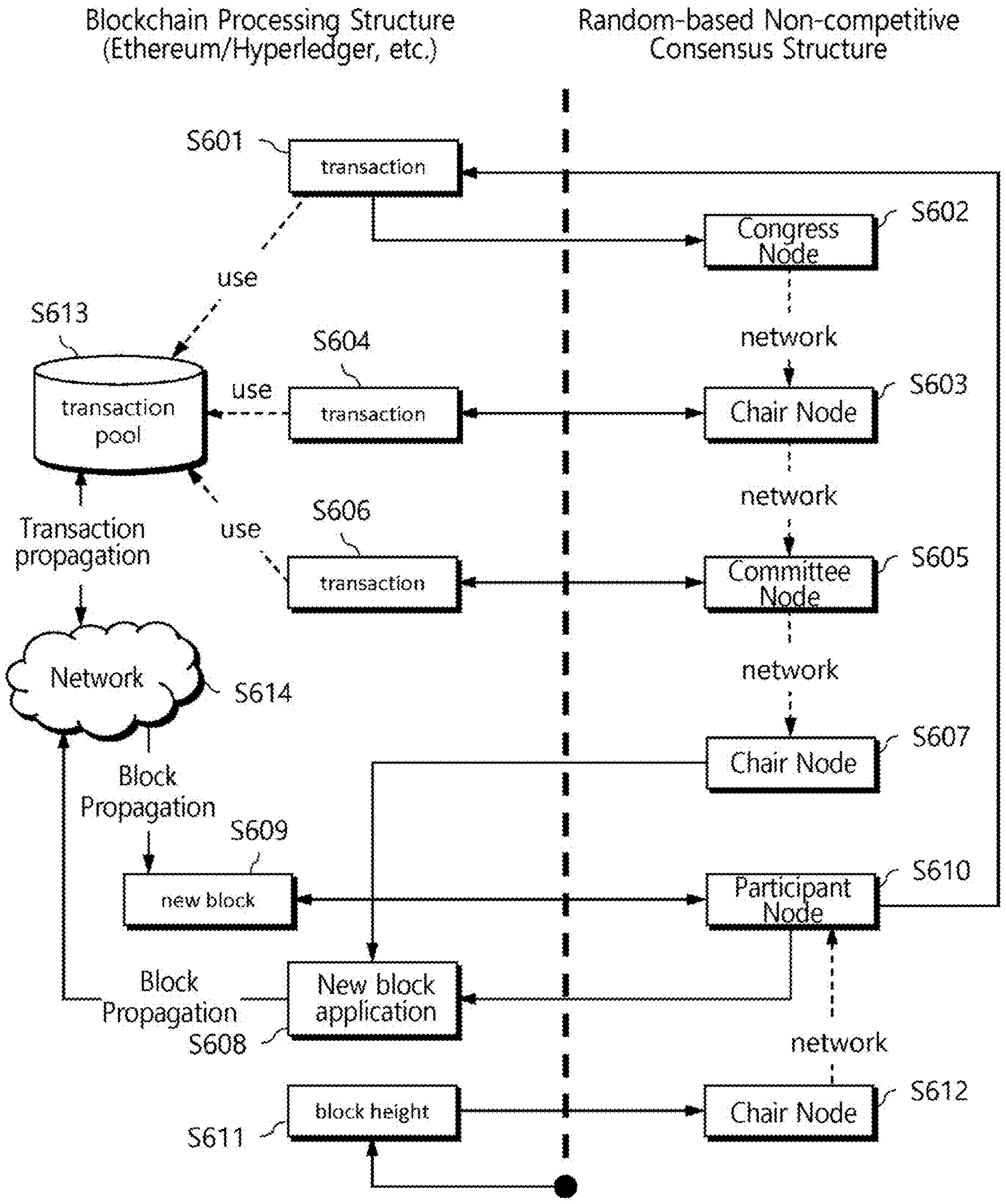
FIG. 6 is a flowchart specifically implementing the node operation method of FIG. 5 through a combined structure of blockchain network protocol and random non-competitive consensus protocol.

FIG. 6 is a flowchart specifically implementing the node operation method of FIG. 5 through a combined structure of blockchain network protocol and random-based non-competitive consensus protocol. Here, each step is described focusing on the roles of each node in the random-based non-competitive consensus structure and interactions with the blockchain. At this time, the blockchain can be conventional blockchain methods that do not adopt random-based non-competitive consensus structures such as Ethereum or Hyperledger, and a random-based non-competitive consensus blockchain network system can be implemented by removing Ethereum consensus and connecting the random-based non-competitive consensus structure to the engine interface. Referring to FIG. 6, S614 represents existing blockchain network/processing structures like Ethereum, and S613 represents the transaction pool on the existing blockchain network.

In step S601, transactions to be included in the Delegate Request MSG are selected from the blockchain transaction pool.

In step S602, the congress node generates a delegate request message with transactions and transmits the generated delegate request message to the chair node through the network.

In step S603, the chair node receives and parses the delegate request message, and includes only transactions that meet consensus conditions among the transactions included in the delegate request message in the Prepare MSG. At this time, through step S604, transactions that do not meet consensus conditions can be added back to the transaction pool. Now, the chair node generates a prepare message containing transactions and transmits the generated prepare message to all committee nodes through the network.

In step S605, the committee node receives and parses the prepare message. At this time, through step S606, the committee node performs filtering among the transactions sent in the prepare message to generate a commit MSG.

After checking whether transactions sent in the prepare message exist in its own transaction pool, it proceeds with the filtering process to generate a commit message. Then, the committee node transmits the generated commit message to the chair node through the network.

In step S607, the chair node parses the received commit message and generates a Committed MSG containing random-based non-competitive consensus data. At this time, the transmission of the committed message is done through an indirect method via block propagation, not the conventional direct transmission.

In step S608, the new block stores the committed message additionally and is propagated to the blockchain network (S614). Also, through step S609, when a new random-based non-competitive consensus block (NewPonBlock) is added to the blockchain, the committed message is delivered to the random-based non-competitive consensus structure.

In step S610, the participant node parses the committed message contained in the new random-based non-competitive consensus block to verify whether it is a Genesis Committed MSG. If the verification result is a Genesis Committed Message, it checks whether the participant node itself is a congress node. If the participant node itself is a congress node for this new random-based non-competitive consensus block generation, it selects transactions to include in the message. On the other hand, if not, it waits for a newly generated block and stands by receiving a sync signal.

Through step S611, the current block height is obtained from the blockchain network. Then, in step S612, the chair node generates a Genesis Committed MSG for starting consensus and can transmit the generated Genesis Committed Message to all participant nodes through the network.

In present embodiment, the committed message can be set with the current block height as the consensus height and increase by 1 as consensus proceeds. Here, block generation can start from consensus height+1. Now, when a committed message is generated, verification data is included in the new block to verify that the new block was created by the random-based non-competitive consensus algorithm. Then, nodes can verify the received new block using the verification data according to the random-based non-competitive consensus. Since the verification data according to the random-based non-competitive consensus has been stored in the ledger by propagating the new block to the blockchain, the verification data can be used for block verification received when new nodes are added and synchronized.

Figure 7:
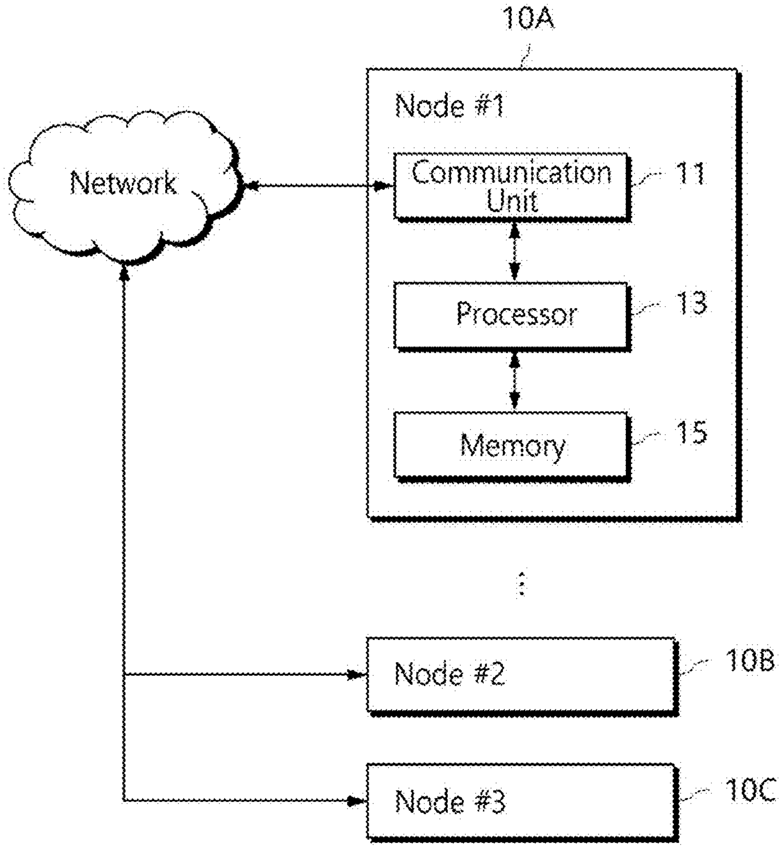
FIG. 7 is a block diagram showing a blockchain network system based on random non-competitive consensus according to another embodiment of the present specification.

FIG. 7 is a block diagram showing a blockchain network system based on random non-competitive consensus according to another embodiment of the present specification, where various nodes (10A, 10B, 10C) accessing the blockchain network exist, and their hardware configuration is briefly shown.

Each node can include a communication unit (11), processor (13), and memory (15), and when node roles are configured in step S510 as defined through the operation method of FIG. 5, each node performs the functions assigned to it. For this, a program including a series of predefined commands can be stored in memory (15), and the processor (13) can load the program stored in memory (15) to perform defined operations. At this time, the communication unit (11) can be utilized for communication with the blockchain network or interaction with other nodes.

Although each node has different roles as defined through FIG. 5, since the nodes of the present specification accessing the blockchain network are nodes based on random non-competitive consensus, they can be randomly selected in a decentralized, non-competitive manner to participate in consensus, so they can commonly have the hardware configuration shown in FIG. 7.

Implementation according to the present specification can be implemented by various means, for example, hardware, firmware, software, or combinations thereof. In the case of hardware implementation, an embodiment of the present specification can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc. In the case of implementation by firmware or software, an embodiment of the present specification can be implemented in the form of modules, procedures, functions, etc. that perform the capabilities or operations described above. Software code can be stored in memory and driven by a processor. The memory is located inside or outside the processor and can exchange data with the processor by various known means.

Meanwhile, the embodiments of the present specification can be implemented as computer-readable code on a computer-readable recording medium. Computer-readable recording media include all types of recording devices that store data that can be read by computer systems. Examples of computer-readable recording media include ROM, RAM, CD-ROM, magnetic tape, floppy disk, optical data storage devices, etc. Also, computer-readable recording media can be distributed in computer systems connected by networks, and computer-readable code can be stored and executed in a distributed manner. And functional programs, codes, and code segments for implementing the embodiments can be easily inferred by programmers in the technical field to which the present specification belongs.

The present specification has been examined above focusing on its various embodiments. Those skilled in the art to which the present specification belongs will understand that various embodiments can be implemented in modified forms without departing from the essential characteristics of the present specification. Therefore, the disclosed embodiments should be considered from an explanatory perspective rather than a limiting perspective. The scope of the present specification is shown in the claims rather than the foregoing description, and all differences within the equivalent scope should be interpreted as included in the present specification.

INDUSTRIAL APPLICABILITY

According to the embodiments of the present specification described above, by defining the roles of nodes and their respective operations to enable utilization of conventional blockchain networks that do not adopt random non-competition as blockchain networks based on random non-competitive consensus bodies, it is possible to control existing proof of work or proof of stake blockchain networks to no longer operate in proof of work or proof of stake methods, or control them to operate limitedly according to the minimum number of nodes in Byzantine fault-tolerant consensus bodies, while enabling the operation of random consensus body proof-based blockchain networks based on established blockchain networks.

Accordingly, it is possible to convert to utilize as a random consensus body proof-based blockchain network while maximally maintaining the infrastructure and utility of established blockchain networks that do not adopt random non-competition, thereby providing an efficient and fair blockchain network platform system while preventing waste of resources and social costs.

The invention claimed is:

1. A method of operating a node accessing a blockchain network, comprising:

configuring roles of nodes by selecting each of a participant node, a congress node, a committee node, and a chair node based on random non-competitive consensus;

the chair node receiving a delegation request from the congress node and instructing the committee node to generate a block using transactions that meet consensus conditions;

the committee node communicating with the chair node to approve block generation; and propagating a new block generated according to the approval result to the blockchain network, wherein the configuring roles of nodes comprises:

selecting a congress node, which is a node that has passed qualification verification for participating in consensus of the next block, from participant nodes participating in random non-competitive consensus;

selecting committee nodes according to a consensus quorum from the congress nodes; and designating the chair node corresponding to the congress nodes or committee nodes.

2. The method of claim 1, wherein the instructing block generation comprises:

selecting transactions necessary for a delegation request from a transaction pool of the blockchain network;

the congress node generating a delegate request MSG including the selected transactions and transmitting to the chair node; and the chair node generating a prepare MSG including only transactions that meet consensus conditions among the delegate request MSG and transmitting it to all committee nodes.

3. The method of claim 2, wherein the instructing block generation further comprises:

the chair node receiving and parsing the delegate request MSG to generate the prepare MSG, and adding transactions that do not meet the consensus conditions to the transaction pool.

4. The method of claim 2, wherein the approving block generation comprises:

the committee node parsing the prepare MSG and checking whether transactions included in the prepare MSG exist in its own transaction pool, then generating a commit MSG through filtering and transmitting it to the chair node; and the chair node parsing the commit MSG to generate a committed MSG containing random non-competitive data and transmitting it through an indirect method via block propagation.

5. The method of claim 4, further comprising:

when the committed MSG is generated, providing verification data to verify that the block of the blockchain network was generated by random non-competitive consensus by including it in the new block; and a general node verifying the new block received through the blockchain network using the verification data.

6. The method of claim 1, wherein the propagating the new block to the blockchain network comprises:

delivering an approval result to the participant node when a new random non-competitive block is added to the blockchain network; and the participant node parsing a committed MSG included in the new random non-competitive block to verify whether it is a Genesis Committed MSG.

7. The method of claim 6, wherein the propagating the new block to the blockchain network further comprises:

selecting transactions to include in the committed MSG when the verification result is the Genesis Committed MSG and the participant node is a congress node; or waiting for a newly generated block when the verification result is the Genesis Committed MSG and the participant node is not a congress node.

8. The method of claim 1, further comprising:

obtaining a current block height from the blockchain network;

the chair node generating a Genesis Committed MSG for starting consensus using the current block height; and the chair node transmitting the generated Genesis Committed MSG to all participant nodes through the network.

9. The method of claim 1, wherein the random non-competitive consensus:

derives non-competitive consensus between nodes, wherein only some nodes among nodes accessing the blockchain network participate in consensus by acquiring participation qualifications using a nonce value for each block, and maintains a Byzantine node ratio among all nodes below a predetermined ratio.

* * * * *